Eldon E. Hulsey
INVENTOR.

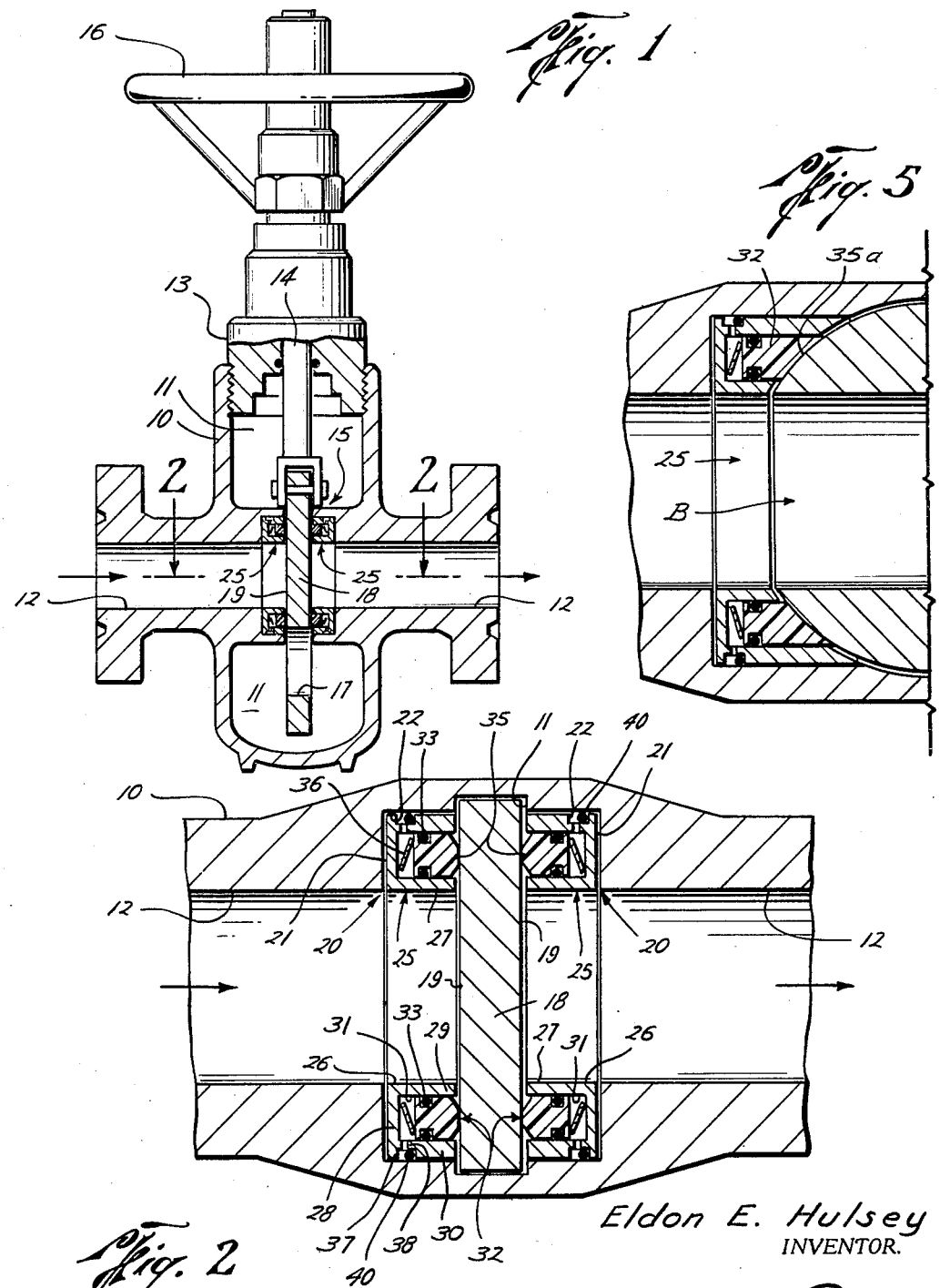

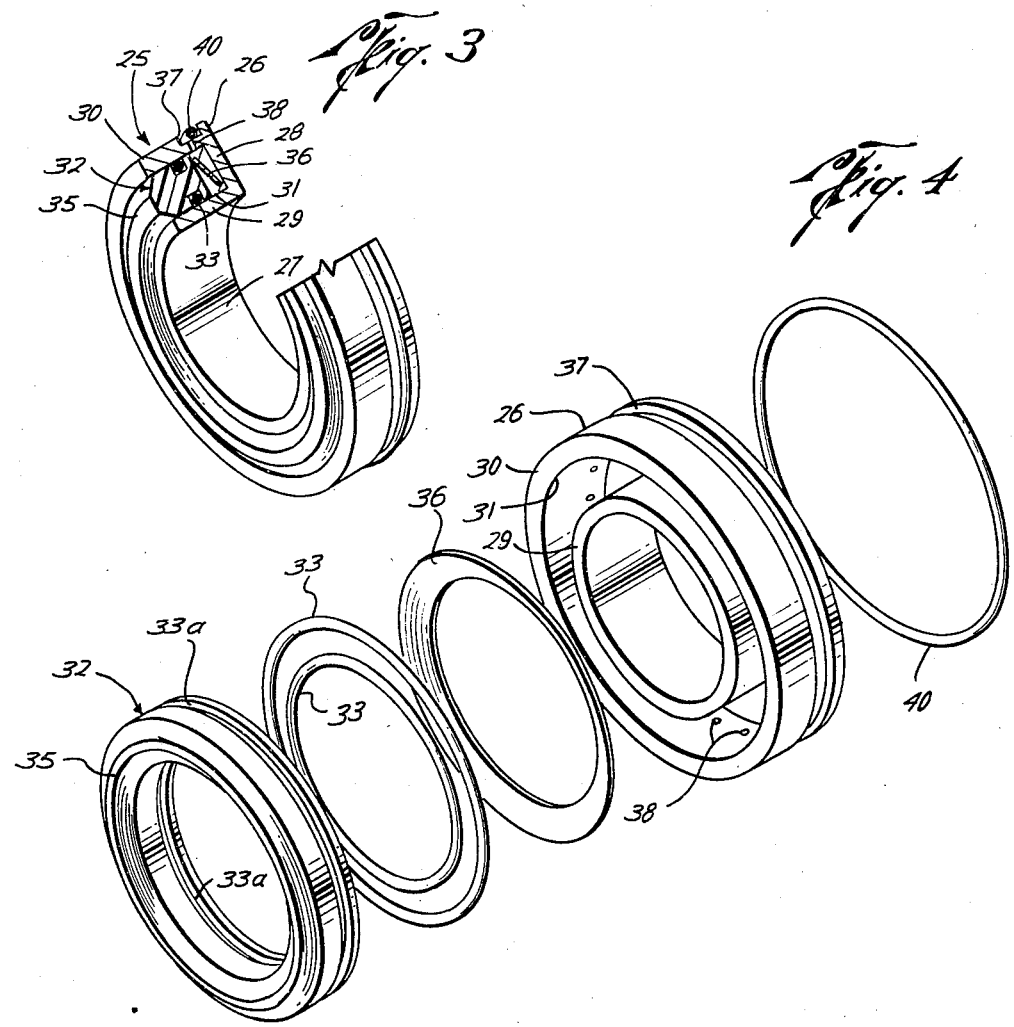

BY

ATTORNEY

3,497,177
SEAT AND SEAL ASSEMBLY FOR VALVES
Eldon E. Hulsey, 5747 Warm Springs,
Houston, Tex. 77035
Filed Nov. 2, 1967, Ser. No. 683,756
Int. Cl. F16k 25/00, 3/00, 5/00
U.S. Cl. 251—172                                1 Claim

ABSTRACT OF THE DISCLOSURE

A seat and seal assembly for valves characterized by an annular seat ring having an annular seal element concentrically mounted therein for independent relative axial movement toward a valve closure member in response to differential pressures across the assembly.

---

Numerous types of valves are conventionally employed for controlling and regulating the flow of all types of fluids and it is, of course, the primary function of valves in almost all cases to be able to fully close off the flow of fluid in a conduit when and as required. It is most important, therefore, to provide means for assuring fluid-tight sealing of the valve closure member in the conduit-closing position under the conditions of operation to be anticipated.

Assurance against leakage in valves controlling high pressure, large diameter conduits, such as oil and gas pipe lines, is particularly difficult and while numerous types of seat and seal arrangements have heretofore been designed and employed with varying degrees of success, the need remains for sealing mechanisms which will provide tight sealing under all conditions.

Accordingly, the present invention is directed to a seat and seal assembly which will provide highly efficient sealing of a valve closure member to bubble-tightness; which is applicable to sealing of various types of valves; which is actuatable in response to differential pressures in any direction across the valve, including differentials between trapped pressure in the valve body and both upstream and downstream pressures; which may be employed to seal one or both sides of a valve; and which is simple in form and cheap to construct and install.

In accordance with one embodiment of this invention, the seat and seal assembly includes an annular seat body adapted for axially slidable disposition in a valve flow port toward an opposing surface of a valve closure member. The seat body is generally U-shaped in cross-section defining an annular recess opening toward the closure member. An annular seal element, sealingly engaged with the walls of the recess, is slidably disposed in the recess for movement therein toward the closure member, and is preferably resiliently biased toward the closure member. A circumferential groove is provided in the outer periphery of the seat body and one or more passageways communicate the groove with the interior of the recess rearwardly of the seal element. A seal ring is mounted in the groove to seal between the seat body and the wall of the surrounding flow port and is arranged for shuttling movement coaxially of the seat body from one side of said passageways to the other in accordance with the direction of the pressure differentials in the flow port across the seat and seal assembly so as to direct the higher pressure into the recess behind the seal element to urge the latter into tight sealing engagement with the opposed surface of the valve closure member.

Other embodiments of this invention are directed to valves of different types incorporating seat and seal assemblies of the kind heretofore described and modifications thereof.

Other and more specific objects and advantages of this invention will become more readily apparent from the following detailed description when read in conjunction with the accompanying drawing which illustrates several useful embodiments in accordance with this invention.

In the drawing:

FIG. 1 is a partly sectional, partly elevational view of a gate-type valve embodying seat and seal assemblies in accordance with one embodiment of this invention;

FIG. 2 is a transverse cross-sectional view, in enlarged scale, taken along line 2—2 of FIG. 1;

FIG. 3 is a perspective view, partly in section, of the seat and seal assembly shown in FIG. 2;

FIG. 4 is an exploded view, in perspective, of the seat and seal assembly of FIG. 3;

FIG. 5 is a fragmentary sectional view illustrating a seat and seal assembly in accordance with this invention modified for sealing with a ball-type valve closure element;

FIG. 6 is a fragmentary sectional view, on enlarged scale of a seat and seal assembly in accordance with another embodiment of this invention.

Figure 7:
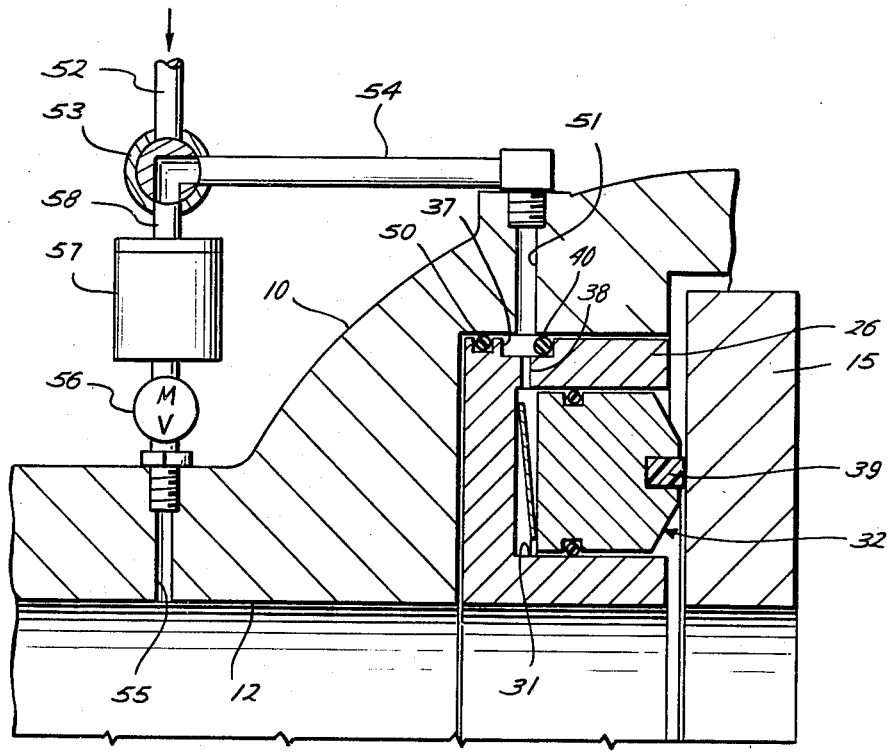
FIG. 7 is a fragmentary sectional view of still another modification of this invention.

Referring to the drawing, FIG. 1 illustrates a generally conventional form of gate valve comprising a hollow housing 10 enclosing a gate chamber 11 which intersects the flowway defined by coaxial opposed flow ports 12, 12. The upper end of chamber 11 is closed by means of a suitable and generally conventional bonnet 13 in which is reciprocably mounted a gate stem 14 to which is connected a valve closure member, designated generally by the numeral 15, and driven by an operator, such as hand wheel 16. Member 15, in the illustrative embodiment, is shown as a generally conventional slab-type gate having through conduit port 17 in its lower portion and a solid closure portion 18 in its upper portion defining closure surfaces 19, 19 on its opposite sides adapted to close off the flowway when the gate is in the lower or closed position illustrated in FIG. 1.

The inner ends of flow ports 12, 12 are counterbored to provide annular recesses, designated generally by the numerals 20, 20, coaxial with the flow ports 12, 12 and defined by flat bottom surfaces 21, 21 and cylindrical walls 22, 22. An annular seat and seal assembly, designated generally by the numeral 25, is coaxially disposed in each of the recesses 20 for axially slidable movement therein.

As best seen in FIGS. 2, 3 and 4, each assembly 25 comprises an annular seat body 26 having an inner bore 27, the diameter of which is preferably the same as that of flow ports 12, 12 to be substantially flush therewith. Body 26 is constructed of any suitable metal and is generally U-shaped in cross-section, being defined by a substantially flat outer end wall 28 and radially spaced concentric, generally cylindrical, inner and outer walls 29 and 30, respectively, defining between them an inwardly (toward gate chamber 11) opening annular recess 31 in which is slidably mounted an annular seal element, designated generally by the numeral 32.

Annular seal rings, such as O-rings 33, are mounted in grooves 33a provided in the inner and outer peripheries of seal element 32 to maintain slidable sealing engagement respectively with inner and outer walls 29 and 30. The forward end of the seal element may be shaped to have a forwardly projecting nose 35 adapted to press against the opposed surface 19 of the valve closure member. A suitable resilient means, such as a Bellville spring 36, is disposed between end wall 28 of the seat body and the inner end of seal element 32 to resiliently bias the latter outwardly of recess 31 toward the valve closure member.

Seal element 32 may be constructed of any suitable material or combination of materials capable of assuring tight sealing with surface 19 when strongly pressed thereagainst. Seal element 32 may be constructed entirely of a plastic material, such as Teflon, which in addition to its sealing properties, has a low coefficient of friction. Or the seal element may be constructed of metal and provided with a plastic insert 39 (FIG. 7) in nose portion 35. The particular material and configuration employed in seal element 32 will ordinarily be selected in accordance with the conditions of service in which the valve is used. In other modifications, seal element 32 may comprise a metal body coated with Teflon film, or may be constructed entirely of a deformable plastic material such as synthetic or natural rubber, fibre glass-reinforced plastic and the like.

An annular groove 37 is provided in the exterior surface of outer wall 30 of the seat body intermediate its ends and a plurality of radial passages 38 communicate groove 37 with the interior of recess 31 rearwardly of seal element 32. An annular seal ring, such as an O-ring 40, is mounted in groove 37 for axial shuttling movement therein from one side to the other of passages 38 while maintaining sealing engagement with cylindrical wall 22 of recess 20. It will be understood that the width of groove 37 will be made sufficiently greater than the thickness of O-ring 40 (herein termed the "shuttle seal") to provide space sufficient to allow O-ring 40 to move from one side to the other of passages 38, so that in one position the shuttle seal will seal off between the seat body and wall 22 inwardly of passages 38 and in the other position to seal off between the seat body and wall 22 outwardly of passages 38.

In operation, assuming for example that fluid flow through the valve is from left to right, as indicated by the arrows in FIGS. 1 and 2, and gate 15 is moved to the closed position shown, the upstream pressure in upstream flow port 12 being the dominant pressure, will act against the rearward end face of the upstream seat body 26 urging the entire assembly toward the upstream face 19 of gate closure portion 18. The upstream pressure will also enter the annular space between the seat body and wall 22 of seat recess 20 and since this space is sealed off by O-ring 40, the upstream pressure will move this O-ring to the downstream side of passages 38, opening the latter to admit the higher upstream pressure to the interior of recess 31, where this higher pressure will act on the inner end of seal element 32 to push the latter into tight sealing engagement with surface 19 of the valve closure. Thus, seal element 32 will be capable of movement independently of the movement of body 26.

At the same time, the upstream pressure will be trapped in chamber 11, and since it will be higher than the downstream pressure, will enter the annular space between the downstream seat body and surrounding wall 22 and will act on the downstream shuttle seal 40 to move the latter in groove 37 to the downstream side of passages 38, as seen in FIG. 2. With this movement of the shuttle seal the higher pressure in chamber 11 will be communicated into recess 31 of the downstream assembly and will act against downstream seal element 32 to urge the latter tightly against downstream face 19 of the valve closure.

By employing assemblies 25 on both sides of the valve closure member, it will be seen that simultaneous sealing of both sides of the closure member will be accomplished. Also, should there be reverse surges of line fluid pressure sealing of both sides of the closure member would be effected but in the reverse direction. Accordingly, it will be seen that the shuttle seal will move in the direction of the pressure differential across the respective seat and seal assemblies.

It will be evident that a seat and seal assembly as herein described will be readily actuated by relatively small pressure differentials in any direction to assure fluid-tight sealing under all conditions. It will also be evident that sealing may be accomplished on only one side of a closure member by using only one seat and seal assembly, but generally it will be preferable to employ the symmetrical arrangement and dual sealing afforded by using two assemblies as shown.

FIG. 5 illustrates a modification for sealing a valve closure member of the ball-type. The only change involved from that previously described is the form of the nose portions 35a of the main seal elements 32 which is made to a concave generally spherical configuration adapted to mate with the opposed surface of the ball-shaped closure member designated by the letter B. In all other respects the seat and seal assemblies may be substantially identical in form and function to the previously described embodiment.

FIG. 6 illustrates a modification of the seat and seal assembly in which both the seat body and the main seal element may function as seals. As illustrated, the seat body 126 is of generally the same shape as seat body 26 of the previously described embodiment, and includes an end wall 128 and inner and outer side walls 129 and 130, respectively, defining between them the annular recess 131. The exterior of the seat ring is provided with groove 137 connected by passages 138 to the interior of recess 131 and having mounted therein the shuttle seal 140. The inner end of wall 129 projects inwardly a short distance with respect to outer wall 130 in order to engage the face of closure members 15 in advance of wall 130 and is preferably provided with a plastic insert, nose or tip 134 capable of tight sealing engagement with the opposed surfaces of the closure member.

Slidably mounted in recess 131 is the main seal element 132 carrying internal and external seals 133 for slidable sealing engagement with the surrounding walls 129 and 130. The outer portion of seal element 132 is reduced in external diameter to form the tubular neck 132a which carries on its forward end a deformable plastic insert, tip or nose 135 adapted to seal tightly with the opposed surfaces of closure member 15 when seal element 132 is urged strongly thereagainst. An annular bushing 142 having a bore 143 adapted to slidably receive neck 132a of the main seal element is inserted into recess 131 surrounding neck 132a and is threadedly secured to the seat body by means of threads 144 which engage mating threads 145 provided on the inner surface of wall 130 of the seat body. Inner and outer seal packings 146 and 147 are provided between the inner and outer peripheries of bushing 142 and the adjacent surfaces of neck 132a and wall 130 to seal against fluid leakage. The reduction in external diameter in seal element 132 to form neck 132a provides an annular forwardly facing shoulder 148 opposing the inner end of bushing 142. The latter, therefore, will function as a stop to limit outward movement of seal element 132 from recess 131. A biasing spring 136 is mounted in recess 131 between the inner face of wall 128 and the inner end of seal element 132 to normally urge the seal element outwardly of recess 131 toward the opposed surface of closure member 15.

The modification illustrated in FIG. 6 functions in exactly the same manner as those previously described, the principal difference being that line pressure acting on the seat body will not only move seal element 132 to sealing engagement with the closure member, but will also urge seat body 126 toward the closure member and force sealing element 134 into sealing engagement with the surface of the closure member. Since seal element 134 projects forwardly relative to the end of wall 130, as previously noted, a secondary seal will be effected thereby adding to the sealing action produced by the forces urging seal element 132 toward the closure member. A shuttle seal 140 will function in exactly the same manner as described previously, being movable from one side of passages 138 to the other in response to the direction of pressure differentials across the sealing unit in the valve flow port in which it is mounted.

FIG. 7 illustrates still another modification of the present invention which is arranged to employ external pressure to actuate the seal element. As there illustrated, seat body 26 is modified slightly to mount on O-ring seal 50 about the exterior of the seat body rearwardly of groove 37. A channel 51 is drilled through the wall of valve housing 10 at a point to communicate the exterior of the housing with the interior of groove 37 between O-ring seals 40 and 50, thereby placing channel 51 in communication with passages 38 which communicate groove 37 with the interior of recess 31. With this arrangement, pressure fluid from an external source (not shown) may be directed through a conduit 52 and 3-way valve 53 into a pipe 54 connected to channel 51. As much pressure fluid may be thus introduced into recess 31 as may be necessary to urge tight sealing by seal element 32 with the opposed surface of gate 15.

This embodiment may also use the upstream line fluid as a source of pressure fluid for actuating seal element 32 and may be employed particularly where the line fluid carries sand, scale or other particulate material which might plug the passages and spaces in the seat and seal unit if brought directly from the line into the unit, as in the previously described embodiments. In this modification, the line fluid is led through a passage 55 from flow port 12 to the exterior of the valve housing, thence through a valved connection 56 to a screen or filter device 57 of any generally suitable and conventional form, which will remove the foreign material from the line fluid. The clean fluid will then flow through a conduit 58 connected to another inlet port of valve 53 which, in the position shown, will direct the filtered fluid through conduit 54 and channel 51 to actuate the seat and seal assembly, as described.

It will be evident that various other modifications and changes may be made in the details of the illustrated embodiments within the scope of the appended claims but without departing from the spirit of this invention.

What I claim and desire to secure by Letters Patent is:

1. In a valve including a housing having a flow passage therethrough and a gate valve closure member slidably disposed in said passage for controlling the same, a seat and seal assembly comprising:
    (a) an annular seat body slidably insertable in the valve flow passage for movement therein relative to an opposed surface of the valve closure member,
    (b) an annular recess in the forward end of said body,
    (c) an annular seal element slidably mounted in said recess, and
    (d) means on the body responsive to fluid pressure differentials in said flow passage for selectively directing line or valve body pressure in said flow passage into said recess directly against said seal element to urge the latter outwardly of the recess into sealing engagement with said opposed surface,
        said seat body being generally U-shaped in cross-section and having an end wall and spaced apart concentric inner and outer peripheral walls defining said recess,
        said seal element including an enlarged portion snugly fitting within the peripheral walls of the seat body and adjacent to but spaced from the end wall thereof, and including also a reduced portion having a plastic nose portion for engagement with the adjacent surface of the closure member,
    the outer peripheral wall of said seat body having an annular internally projecting bushing co-acting with said reduced portion of the seal element and inner and outer seal packings provided on said bushing,
    the inner wall of said seat body also having an annular plastic nose portion for engagement with the adjacent surface of said closure member.

References Cited

UNITED STATES PATENTS

| | | | |
|---|---|---|---|
| 783,953 | 2/1905 | Henry | 251—172 |
| 2,664,267 | 12/1953 | Bay | 251—174 |
| 2,996,083 | 8/1961 | Huska | 251—175 XR |
| 3,047,265 | 7/1962 | Kaiser | 251—172 |
| 3,077,201 | 2/1963 | Dumm | 251—315 XR |
| 3,110,470 | 11/1963 | Dumm | 251—172 XR |
| 3,235,224 | 2/1966 | Grove | 251—174 |
| 3,250,510 | 5/1966 | Williams | 251—173 |
| 3,353,783 | 11/1967 | Bolling | 251—172 |
| 3,405,911 | 10/1968 | Bolling | 251—172 |

HAROLD W. WEAKLEY, Primary Examiner

U.S. Cl. X.R.

251—174, 175, 176, 315, 328, 363